Aug. 29, 1933.  E. J. W. RAGSDALE  1,924,880
OPEN TRUSS GIRDER
Filed Feb. 7, 1930
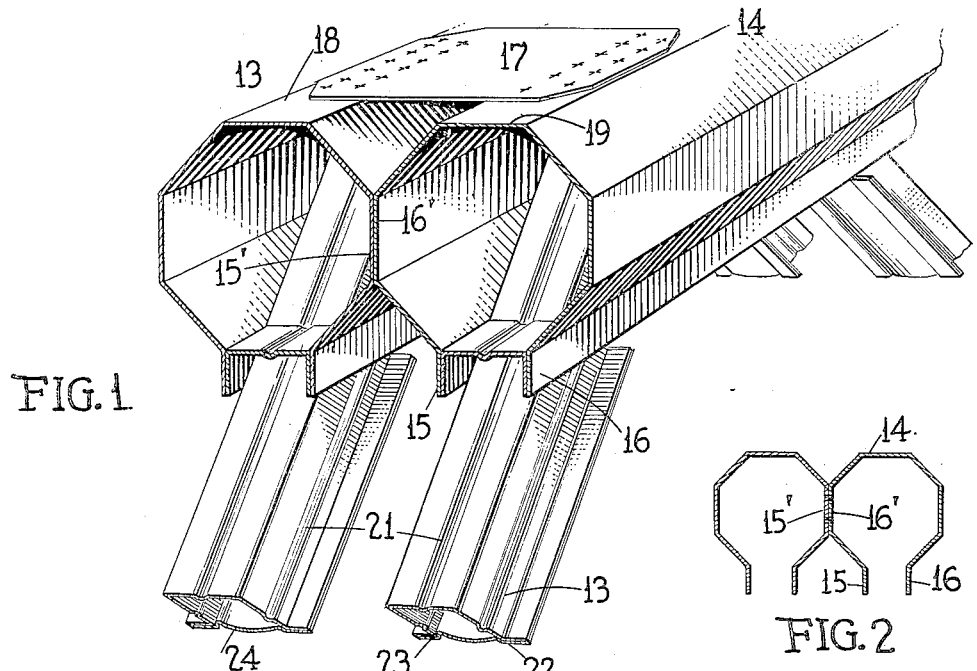
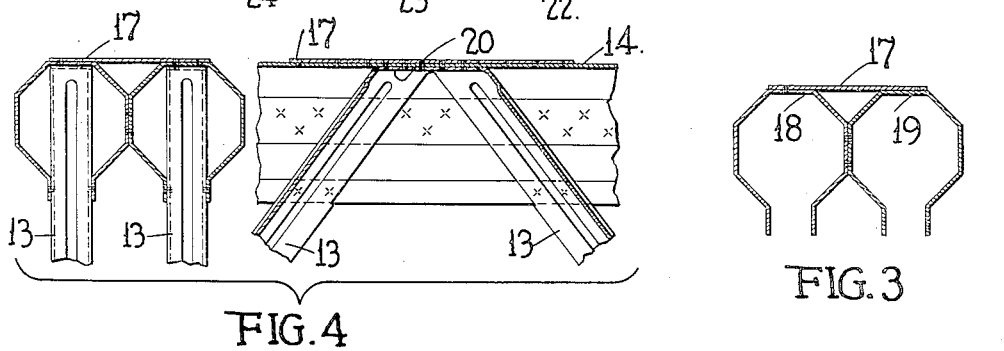
INVENTOR.
EARL J. W. RAGSDALE.
BY
*John P. Taylor*
ATTORNEY.

Patented Aug. 29, 1933

1,924,880

UNITED STATES PATENT OFFICE 1,924,880

OPEN TRUSS GIRDER

Earl J. W. Ragsdale, Norristown, Pa., assignor to Edward G. Budd Manufacturing Company, Philadelphia, Pa., a corporation of Pennsylvania Application February 7, 1930. Serial No. 426,471

6 Claims. (Cl. 189—37)

My invention relates to open trussed girders and particularly to such girders made of pressed metal, and especially adapted for aircraft construction.

It is an object of my invention to provide a truss of this kind in which the ratio of the strength to the weight is relatively large and in which the parts are so constructed and arranged as to permit of ease of assembly by spot welding that easiest and most rapid method of joining sheet metal. In other words, it is a main object of my invention to remove weight, adaptability and cost limitations in this form of truss.

I propose to use a flat strip stock of alloy steel of high physical characteristics, of rustless steel, which can be rolled to any desired shape either at the mills or at the fabricating plants and die formed to some extent. Utilization of strip stock guarantees its availability in reasonable widths in unlimited lengths, providing continuity of all members from one end of the truss to the other. Spot welding constitutes one of the most rapid securing means known, and also one of the most perfect from the standpoint of strength, yet it is a weightless fastening means requiring no metal other than that of the stock joined. The amount of spot welding may be multiplied unlimitedly without adding weight. Nor does it cut into the body of the members joined or impair their strength, no matter what the multiplication of its use. This factor, coupled with the high physical characteristics of the rustless steel alloy when utilized according to the structure and method of the invention achieve for me its principal object—the removal to some extent of the limitations of adaptability and cost—and the structure and method go the balance of the way in removal of these limitations.

According to my invention, I fashion closed section chord members, but leave the inner side of the chord members open, so that the web members can be extended into the hollow chord members, and secured to both the inner and outer side walls thereof. After the web members are secured in place, I complete the closed section of the chord members by members bridging the open sides of the chord members.

The web members themselves may be of hollow closed section, and they may be continuous hollow members bent to form Warren or other form of webbing, being flattened out at the joints where they are joined to the inner surface of the outer walls of the chord members.

For convenience of assembly and to secure the proper proportion between chords and webbing, the chord members are made of polygonal form, in the present instance, of octagonal form, having the inner side of the octagon open and flanged outwardly, and to secure multiple strength and adaptability to strength required at different points in the length thereof, the chord members are arranged in multiple and secured together through their adjacent side walls. At the joints the multiple chord members are reinforced by flat gussets secured across their outside faces.

The construction thus outlined lends itself particularly to rapid and secure assembly according to the method of the invention, in which the multiple chord members are first assembled by welding together their adjacent sides, and then welding the gussets across their outer surfaces or by carrying out these welding operations simultaneously. The ends of the webbing are then inserted through the open sides of the chord members and welded to the flanges at the open side and to the opposite reinforced wall after which the girders are closed by welding flanged bridging members across the open side of the chord members, so that the latter are closed members except at the points where the webbing passes into them.

The portions of the webbing outside the chord members may be closed before or after securing it to the chord members, by a bridging piece or pieces across their open sides.

Other and further objects and advantages will become apparent from the following detailed description when read in connection with the accompanying drawing in which.

Fig. 1 is a fragmentary perspective view showing a trussed girder according to the invention at a joint thereof.

Figs. 2 and 3 are transverse sectional views of the multiple chord in two stages of the assembly thereof.

Fig. 4 represents a transverse and a horizontal section, the latter being taken in the vertical central plane of one of the chords, of the assembled webbing and open sided chords shown in Fig. 3.

Fig. 5 represents similar views of the joint in the complete assembly shown in Fig. 1.

Fig. 6 is a transverse section through one of the web members.

Fig. 7 is a diagrammatic view of a section of a girder according to the Warren type of trussing.

The invention is shown, in Fig. 7, as applied to the Warren type of girder in which upper and lower chords 10 and 11 are employed joined by diagonal or zig-zag webbing 12. The invention relates particularly to the construction at the joints between the chords and webbing to insure great strength and ease of assembly by spot welding. It will be described more particularly in connection with one such joint.

In Figs. 1 and 5, where the complete joint is shown, 13 and 14 represent two hollow chord members joined together by spot welding together their two abutting side walls 15' and 16' to form in effect a unitary chord member.

This joinder of a plurality of chord members adapts the girder to a variation of the strength thereof throughout its length, as desired, by merely leaving off one of the hollow members of each chord together with its webbing where desired. For example, in using the girder as a wing spar for an airplane, the girder may be lightened adjacent its outer ends by making it single and its strength increased toward the center by plural chord and web portions.

The chord members 13 and 14 are preferably made of polygonal cross section to provide flat surfaces for the joinder of parts. In the instant case the cross sectional shape is octagonal with one side left open and provided with inwardly extending edge flanges 15 and 16. Since both sections of the duplex joint are the same, the joinder of the webbing to the chord will be described only with reference to one chord member. The two chord members are reinforced at the joints by a flat gusset member 17 secured by spot welding to the outside faces 18 and 19 of the members.

The webbing 12 is preferably a substantially continuous hollow member 13 of channel cross section of a width adapted to pass between the flanges 15, 16 of the inner open side of the girder members and secured thereto by spot welding said side wall of the webbing to the flanges. The webbing is continued outwardly to the outer side wall 19 of the girder member, as 14, and there has its bottom wall turned at an angle at 20 and secured by spot welding to the double thickness of metal formed by the bottom wall and the reinforcing gusset 17.

Adjacent oppositely inclined portions of the hollow web members 13 may be joined, as shown, by their continuous bottom walls flattened as at 20 where they are secured to the wall 19 of the chord. To permit this flattening, the side walls of the channel may be cut away at these points. It is obvious that each of the diagonal hollow web members 13 may be made a separate unit, if desired.

The bottom and side walls of the web portions 13 may be additionally stiffened by grooves 21 rolled or otherwise formed into these walls and between the chords they may be reinforced by laterally extending edge flanges 22, 23, and the closed section shown in Figs. 1 and 6, formed by securing a grooved plate 24 across the mouth of the channel and to the flanges 22, 23 as by spot welding.

After the webbing has been secured in place in the chord member, as 14, the inner open side thereof is closed by applying to it the outwardly facing channel section members as 25, 26, 27, and welding the sides of the channel to the edge flanges 15 and 16, thus forming a closed section hollow chord member except for the openings through which the web members 13 extend.

The girder so formed combines in itself to an exceedingly high degree the weight, adaptability and cost characteristics so desirable in structures of this kind, particularly where they are used in aircraft construction, where these must be combined with great strength. It is particularly adapted for speedy fabrication according to the method which has become apparent from the preceding disclosure and the steps of which are clearly indicated, by reference successively, to Figs. 2, 3, 4 and 5.

While I have herein described a specific embodiment of my invention, it will be understood that it may be varied and modified without departing from the spirit thereof, and such variations and modifications are to be included in the claims.

What I claim is:

1. A joint for an open trussed girder comprising a hollow chord, and a web member having adjacent portions extending diagonally in opposite directions and joined by a flattened portion, the flattened portion being secured to an inside wall of the chord and the diagonal portions extending through the opposite side wall of the chord and secured thereto.

2. A joint for open trussed girders comprising a plurality of independent hollow polygonal open sided members forming a chord joined together along their adjacent side walls, and hollow web members angularly related to the chord and extending through the open side wall of the hollow members in a plane substantially parallel to the plane of joinder of said members but laterally spaced from said plane and secured to the opposite side walls of said members.

3. A chord for open trussed girders comprising a plurality of hollow members joined together along their adjacent side walls, and having openings in a plane parallel to the plane of joinder to receive the ends of web members adapted to be joined to the side walls of said members opposite said openings, and gussets connecting the side walls of the chord members at the points where web members are adapted to be joined thereto.

4. A joint for an open trussed girder comprising a hollow chord including a polygonal member open on one side and flanged along the edges of the open side, and a hollow web member extending into the open side of said member and secured to said flanged edges, the end of said web member being extended through the hollow polygonal member and secured to the side wall thereof opposite said open side.

5. A joint for an open trussed girder comprising a hollow chord including a polygonal member open on one side and flanged along the edges of said open side and adapted to receive the end of a web member through said open side, and a web member extending through said open side to the opposite wall of said polygonal member and secured to said flanged edges and said opposite wall, and a flanged member bridging the open side of said polygonal member, and secured thereto through the flanged edges.

6. A joint for an open trussed girder comprising a hollow chord open at one side and flanged along the edges of said open side, and a hollow channel section web member angularly related to the chord and extending into the open side thereof and secured through its side walls to said flanged edges, the end of the web member being extended through the hollow chord and secured through its bottom wall to the wall thereof opposite said open side.

EARL J. W. RAGSDALE.